United States Patent
Ogoniek

[19]

[11] Patent Number: 6,032,967

[45] Date of Patent: Mar. 7, 2000

[54] AXLE AND SUSPENSION CONNECTION ASSEMBLY AND METHOD

[75] Inventor: Ron Ogoniek, Ontario, Canada

[73] Assignee: Dana Canada, Inc., Ontario, Canada

[21] Appl. No.: 09/025,305

[22] Filed: Feb. 18, 1998

[51] Int. Cl.[7] .................................................. B60G 9/04
[52] U.S. Cl. .............................. 280/124.175; 280/124.1; 280/124.151; 74/607
[58] Field of Search ........................... 280/124.1, 124.17, 280/124.175, 124.179, 124.151, FOR 175; 74/607; 301/137, 124.1; 403/344

[56] References Cited

U.S. PATENT DOCUMENTS

| | | |
|---|---|---|
| 1,385,483 | 7/1921 | Carter . |
| 1,873,453 | 8/1932 | Mogford et al. . |
| 2,368,695 | 2/1945 | Wilber . |
| 2,752,673 | 7/1956 | Williams . |
| 3,037,818 | 6/1962 | Scheel . |
| 5,303,985 | 4/1994 | Barnholt et al. . |
| 5,328,159 | 7/1994 | Kaufman et al. . |

FOREIGN PATENT DOCUMENTS 1278810  11/1961  France ...................................... 74/607

*Primary Examiner*—Eric Culbreth
*Attorney, Agent, or Firm*—Liniak, Berenato, Longacre & White

[57] ABSTRACT

A spring seat assembly and method of assembling the same reduces field failures related to existing axle and suspension attachment designs. The suspension is attached to the axle housing through an upper spring seat welded to the housing, and the upper seat is then supported by a weld-on lower strap to the lower section of the axle housing whereby the lower strap distributes the weld stress from the vehicle articulation into the lower channel. The upper spring seat and lower strap are subjected to a clamp load prior to welding.

13 Claims, 4 Drawing Sheets

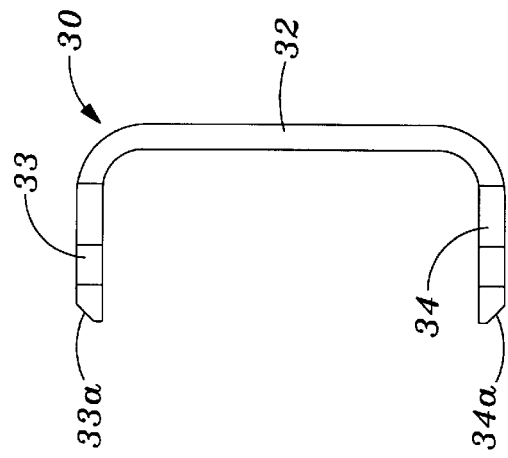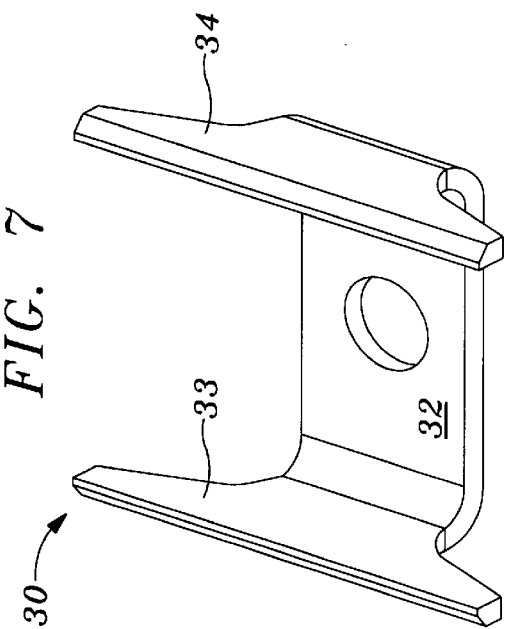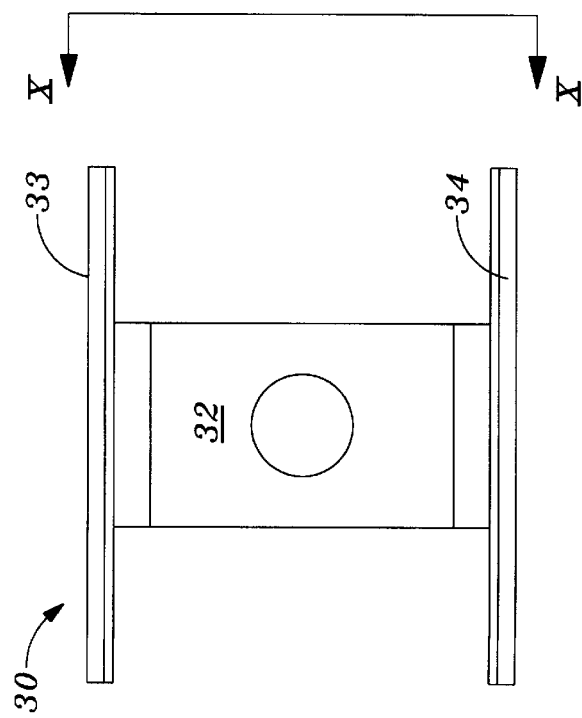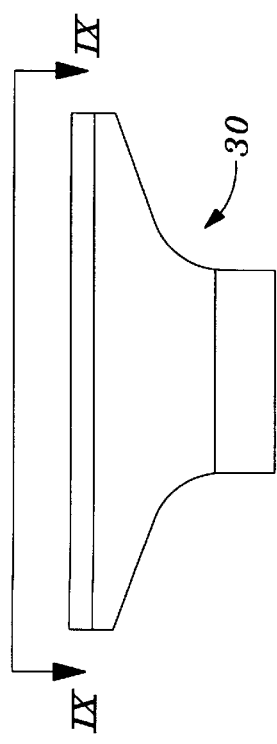

AXLE AND SUSPENSION CONNECTION ASSEMBLY AND METHOD

BACKGROUND OF THE INVENTION a) Field of the Invention

This invention relates in general to vehicle axle assemblies and in particular to an improved axle and suspension connection assembly for connecting an axle assembly to a vehicle suspension system and a method for assembling the same.

b) Description of Related Art

Axle assemblies are well known structures which are in common use in most vehicles. Such axle assemblies include a number of rotatable components which transmit rotational power from an engine of the vehicle to the wheels thereof These rotatable components are usually enclosed in a protective non-rotatable housing. The axle housing typically includes a central carrier (which rotatably supports a differential mechanism therein) having a pair of outwardly extending tubes (which enclose the axle shafts extending from the differential to the wheels of the vehicle). In the past, the tubes have been formed from sections of hollow cylindrical steel tubes which have been welded, bolted, or otherwise secured to the carrier to form the axle housing.

The tubes of these axle housings are frequently provided with one or more additional components for various purposes. For example, it is generally desirable to provide a circumferentially extending flange about the tube near the outer end thereof to function as a mounting surface for the components of the brake for that wheel. Also, a seat is commonly provided on the tube for securing a plurality of leaf springs or similar means for resiliently connecting the frame of the vehicle to the axle housing. Lastly, it is known to provide a pad on the tube to which a bracket is welded for securing a shock absorber or similar means for damping oscillations of the frame of the vehicle relative to the axle housing.

Conventionally, the spring seat is formed from an individual component which is welded, bolted, or otherwise secured to the tubes. For example, U.S. Pat. No. 3,037,818 to Scheel discloses a conventional axle housing including a spring seat which is positioned and welded to an axle center section so as to present a flat spring engaging surface.

The conventional structures and methods for providing an axle and suspension connection assembly suffer from unwanted and dangerous field failures due to stress and fatigue on the components and associated weld joints. The need therefore exists for a spring seat attachment assembly and method which is easier to assemble and does not suffer from the field failures inherent in conventional designs.

SUMMARY OF THE INVENTION

The present invention provides a spring seat assembly and method of assembling the same whereby field failures related to existing axle and suspension attachment designs are reduced.

The suspension of the present invention is attached to the axle housing through an upper spring seat and lower strap welded to the axle housing. The upper spring seat is secured to a weld-on lower strap engaging the lower section of the axle housing whereby the lower strap distributes the induced stress from the vehicle articulation into the lower channel box of the axle housing.

With the assembly method of this invention, the upper seat is press fit onto the upper channel box of the axle housing, and the lower strap is slide fit to the lower channel box of the axle housing. The upper seat and lower strap are clamped together toward one another around the axle housing and are welded in a pre-stressed condition to ensure a proper preload condition. Because the lower strap and upper seat encapsulate the housing arm, the vehicle weight is distributed through both the upper and lower channels of the housing. Because the brackets (upper seat and lower strap) are held with a clamp load prior to welding, the assembly compensates for a portion of the torsional load derived from the vehicle articulation.

The novel axle connection assembly of this invention provides a more durable assembly where failures were previously observed. Further novel features and other objects of this invention will become apparent from the following detailed description, discussion and the appended claims taken in conjunction with the accompanying drawings showing the preferred structures and embodiments.

BRIEF DESCRIPTION OF THE DRAWINGS

FIG. 7 is a perspective view of the lower strap member of the present invention;

FIG. 8 is a side view of the lower strap member shown in FIG. 7;

FIG. 9 is a top view of the lower strap member shown in FIG. 7 as view along the direction IX—IX of FIG. 8;

FIG. 10 is a side view of the lower strap member of FIG. 7 as taken along line X—X of FIG. 9;

DETAILED DESCRIPTION OF THE INVENTION

Figure 1:
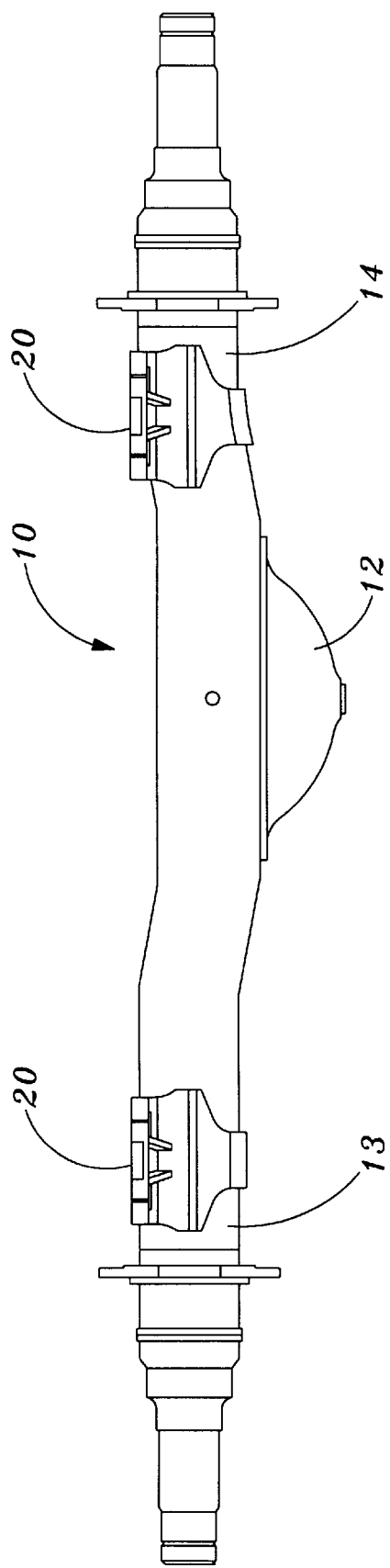
FIG. 1 is an elevation view of an axle housing including a central carrier having a pair of outwardly extending tubes which enclose the axle shafts extending from the differential to the wheels of the vehicle.

FIG. 1 illustrates generally an axle housing 10 including a central carrier 12 which rotatably supports and houses a differential mechanism (not shown). The central carrier 12 has a pair of outwardly extending tubes 13, 14 which enclose the axle shafts extending from the differential to the wheels of the vehicle. FIG. 1 shows a conventional truck axle housing and central carrier; however, the present invention is not limited to the housing design of FIG. 1.

The upper spring seat member 20 of the present invention is illustrated in FIGS. 2–6. In the preferred embodiment, the upper seat member 20 is formed in a generally U-shaped configuration with a pair of fastening wings 26 and 28 having means therein for fastening the upper spring seat to a plurality of leaf springs or similar means (not shown) for resiliently connecting the frame of the vehicle to the axle housing 10. Conventionally, the upper spring seat is bolted or otherwise secured to the leaf spring assembly.

Figure 3:
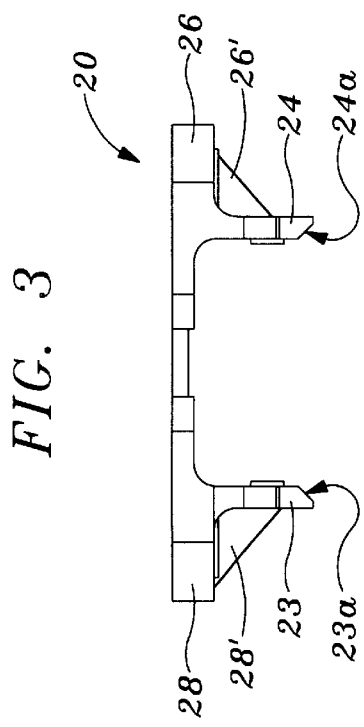
FIG. 3 is a front elevation view of the upper spring seat of FIG. 2.
Figure 4:
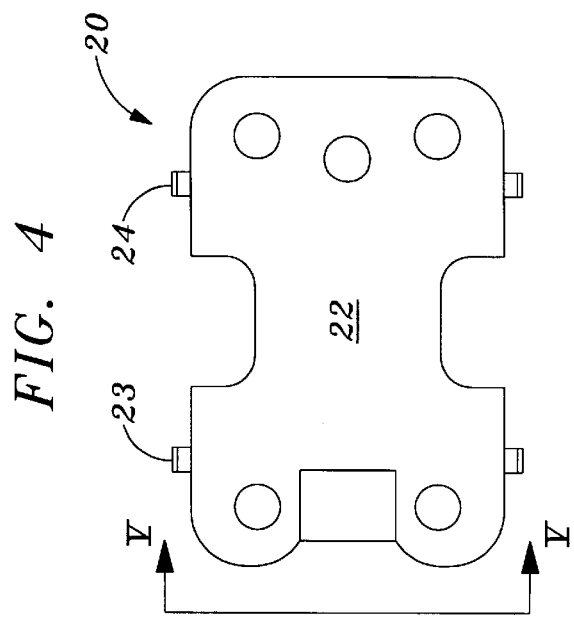
FIG. 4 is a top view of the upper spring seat of FIG. 2.
Figure 5:
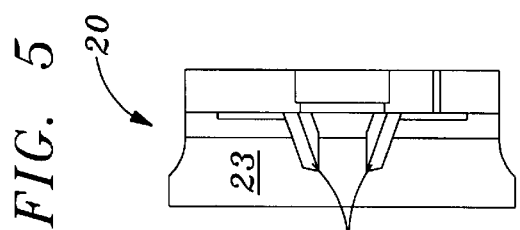
FIG. 5 is a side view of the upper spring seat of FIG. 2 as taken along line V—V of FIG. 4.
Figure 6:
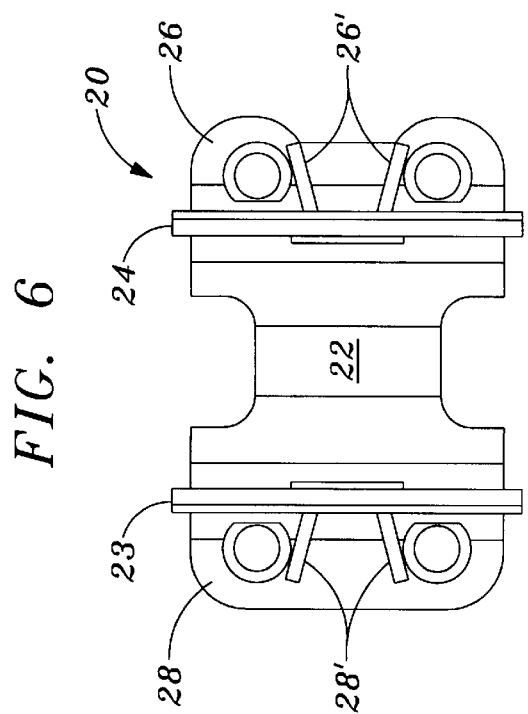
FIG. 6 is a bottom view of the upper spring seat of FIG. 2.

Support flanges or webs 26' and 28' reinforce the fastening wings 26 and 28 to support the fastening wings during the rigors of vehicle use (see FIGS. 3, 5 and 6).

Figure 2:
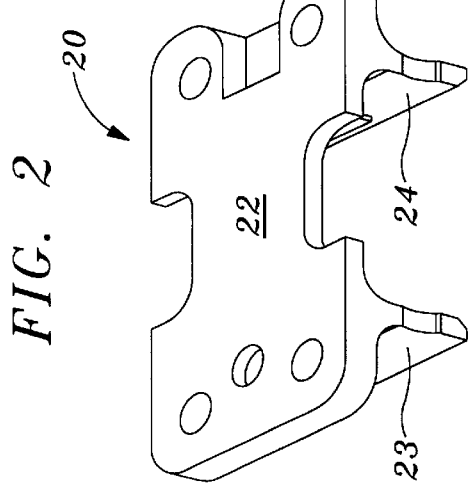
FIG. 2 is a perspective view of the upper spring seat.

The shape of the upper seat spring 20 is defined primarily by the main body portion 22 and side walls 23, 24 extending in a generally perpendicular manner from the main body portion 22 (see FIGS. 2 and 3). The main body portion 22 and side walls 23, 24 are sized for a friction fit on the axle housing. Thus, the main body portion 22 and side walls 23, 24 define those portions of the U-shaped upper spring seat 20 which are press fit onto the upper channel box section of the axle housing to provide frictional resistance therebetween.

The lower strap member 30 will now be described with references to FIGS. 7–10. Similar to the upper spring seat member 20, the lower strap member 30 is formed as a U-shaped member comprising a central body portion 32 and two side walls 33, 34 which are substantially parallel to one another and are dimensioned to partially circumscribe the axle housing at the positions shown in FIG. 1. The lower strap member 30 is sized for a slide fit on the axle housing.

In the preferred embodiment, the side walls 33, 34 comprise terminal edges 33a, 34a, respectively, having a bevelled surface formed in the manner shown in FIG. 10. That is, the bevelled edges 33a, 34a are designed to face away from the interior area of the U-shaped strap 30 and away from the main body portion 32. The bevelled surfaces 33a, 34a confront the corresponding bevelled surfaces 23a, 24a formed respectively on the side walls 23, 24 of the upper spring seat 20.

Figure 11:
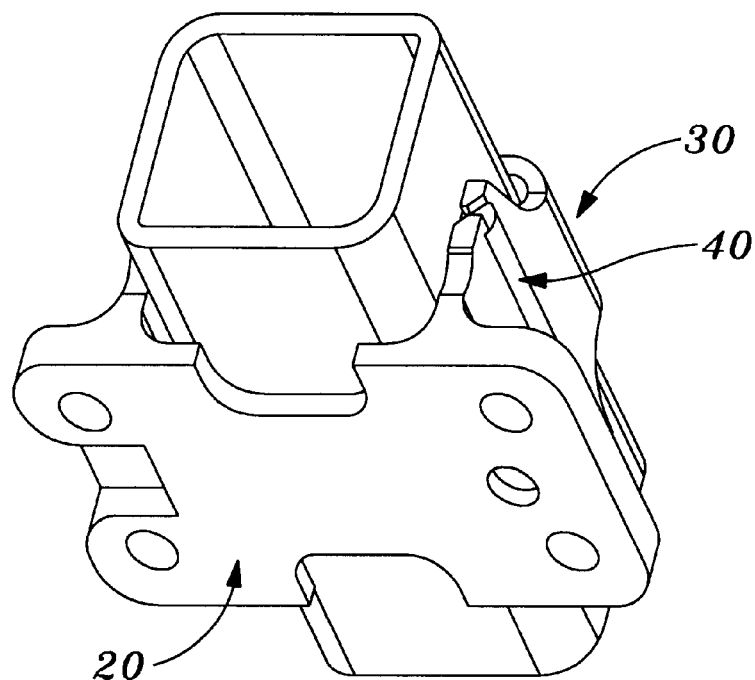
FIG. 11 is a perspective view of the spring seat and lower strap assembly of the present invention encapsulating an axle housing.
Figure 12:
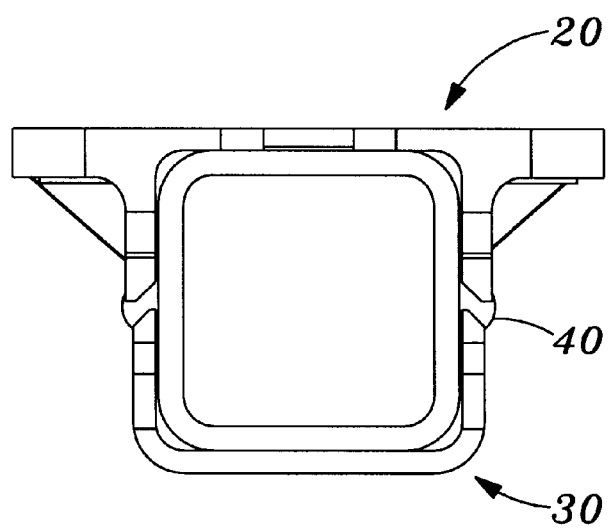
FIG. 12, is a cross sectional view of the spring seat and lower strap assembly of FIG. 11.

At the junction of the bevelled edges 33a, 34a of side walls 33, 34 and the bevelled edges 23a, 24a of side walls 23, 24, the upper spring seat 20 is welded (see weld bead 40) in a conventional manner to the lower strap 30 and to the axle housing to thereby encapsulate the housing arm in the manner shown in FIGS. 1, 11 and 12.

It should be noted that the upper spring seat 20 and the lower strap 30 are subjected to a clamp force prior to welding in order to compensate for torsional loads created by the vehicle during use.

The assembly method of the present invention will now be described with reference to FIGS. 1–12. The upper spring seat 20 is press-fit onto the upper channel of the axle housing, and the lower strap 30 is slide-fit onto the lower channel of the axle housing. The upper seat 20 and lower bracket or strap 30 are welded in a prestressed condition to compensate for torsional loads during use. More specifically, the upper seat 20 and lower strap 30 are pressed onto the housing and held with a clamp load prior to welding.

With this method, the lower strap serves to distribute the weld stress from the vehicle into the lower channel of the axle housing. Applying a preload to the upper seat 20 and lower strap 30 compensates for a portion of the torsional load derived from the vehicle articulation.

The present invention therefore provides a substantial improvement over the conventional structures and methods for providing an axle and suspension connection assembly which typically suffer from unwanted and dangerous field failures due to stress and fatigue on the components and associated weld joints. The instant invention satisfies the long felt need for a spring seat attachment assembly which is easier to assemble and does not suffer from the field failures inherent in conventional designs.

While the foregoing invention has been shown and described with reference to a specific embodiment and method associated therewith, it will be understood by those of skill in the art that various changes in form and detail may be made therein without departing from the spirit and scope of the present invention. For example, the upper bracket and lower strap may be reversed such that the upper bracket may be on the lower channel and the strap may be on the upper channel.

I claim:

1. An axle connection assembly for a vehicle, said assembly comprising:

a spring seat adapted to engage an axle housing, said spring seat comprising connection means for connecting said spring seat to a resilient support of said vehicle;

a strap member adapted to engage said axle housing opposite said spring seat, wherein said spring seat and said strap member substantially circumscribe said axle housing;

wherein said spring seat and said strap member are subjected to a clamp load prior to being welded onto said axle housing.

2. The axle connection assembly according to claim 1, further comprising a weld bead securing said spring seat and said strap member on said axle housing.

3. The axle connection assembly of claim 1, wherein said spring seat is a U-shaped member frictionally engaging said axle housing.

4. The axle connection assembly of claim 1, wherein said strap member is a U-shaped member slidingly engaging said axle housing.

5. The axle connection assembly of claim 1, wherein said strap member distributes an articulating load of said vehicle about a portion of said axle housing opposite said spring seat.

6. A combination axle connection assembly and axle housing for a vehicle, said combination comprising:

an axle housing enclosing a pair of axle shafts;

an upper spring seat engaging said axle housing, said upper spring seat comprising connection means for connecting said upper spring seat to a resilient support of said vehicle;

a lower strap member engaging said axle housing opposite said upper spring seat, wherein said upper spring seat and said lower strap member are adapted to distribute weight and generated loads of said vehicle about a circumference of said axle housing;

wherein said upper spring seat and said lower strap member are subjected to a clamp load prior to being welded onto said axle housing.

7. The axle connection assembly according to claim 6, wherein said upper spring seat and said lower strap member are welded together onto said axle housing.

8. The axle connection assembly of claim 6, wherein said first spring seat is a U-shaped member frictionally engaging said axle housing.

9. The axle connection assembly 6, wherein said strap member is a U-shaped member engaging said axle housing via a frictional engagement.

10. The axle connection assembly of claim 6, wherein said lower strap member distributes articulation loads of said vehicle about a portion of said axle housing opposite said upper spring seat.

11. A method of securing a spring seat member on an axle housing, said method comprising the steps of:

pressing a U-shaped seat member onto said axle housing;

sliding a U-shaped strap member onto said axle housing at a position opposite said seat member, whereby first leading edges of said seat member confront second leading edges of said strap member to thereby define two seams between said seat member and said strap member;

applying a clamp load to said seat member and said strap member; and welding said seat member and said strap member along said two seams.

12. The method according to claim 11, wherein a friction fit is provided between said seat member and said axle housing.

13. The method according to claim 11, wherein a slide contact fit is provided between said strap member and said axle housing prior to said step of welding.

* * * * *